(12) United States Patent
Purpuro

(10) Patent No.: US 6,935,643 B1
(45) Date of Patent: Aug. 30, 2005

(54) HIKER'S TRAIL CARRIER

(76) Inventor: Donald V. Purpuro, 14035 Rosedale Hwy., Space 6, Bakersfield, CA (US) 93312

( * ) Notice: Subject to any disclaimer, the term of this patent is extended or adjusted under 35 U.S.C. 154(b) by 0 days.

(21) Appl. No.: 10/442,497

(22) Filed: May 20, 2003

(51) Int. Cl.[7] .................. B62B 1/00; B62D 51/04; B62D 61/00

(52) U.S. Cl. .................. 280/47.32; 280/47.33; 280/47.31; 280/47.315; 280/1.5; 280/78; 280/653; 280/659

(58) Field of Search .................. 280/47.32, 47.11, 280/47.131, 47.23, 47.3, 47.18, 47.26, 1.5, 280/43, 43.1, 7.14, 28, 79.2, 63, 645, 651, 280/652, 653, 655, 655.1, 659, 656, 78, 47.33, 280/47.315, 47.31, 30, 42; 43/1; 135/912; 296/20

(56) References Cited

U.S. PATENT DOCUMENTS

| | | | | |
|---|---|---|---|---|
| 2,208,891 A | * | 7/1940 | Bowling, Jr. | 280/47.25 |
| 2,546,604 A | * | 3/1951 | Lafky | 296/20 |
| 3,236,537 A | | 2/1966 | Eckman | 280/47.18 |
| 3,977,477 A | * | 8/1976 | Wise | 172/246 |
| 4,055,354 A | | 10/1977 | Sharpe | 280/47.31 |
| 4,063,744 A | | 12/1977 | Fraser | 280/42 |
| 4,236,723 A | * | 12/1980 | Lemmon | 280/1.5 |
| 4,261,590 A | * | 4/1981 | Schupbach | 280/47.31 |
| 4,444,405 A | | 4/1984 | Barrus | 280/47.3 |
| 4,664,395 A | * | 5/1987 | McCoy | 280/1.5 |
| 4,740,008 A | * | 4/1988 | Johnson | 280/475 |
| 4,838,565 A | | 6/1989 | Douglas | 280/1.5 |
| 4,869,517 A | | 9/1989 | Smith | 280/47.3 |
| 5,004,263 A | * | 4/1991 | Hubbard | 280/645 |
| 5,040,807 A | * | 8/1991 | Snover | 280/30 |
| 5,222,757 A | * | 6/1993 | Magyar | 280/653 |
| 5,242,189 A | * | 9/1993 | Osaki | 280/645 |
| 5,385,355 A | * | 1/1995 | Hoffman | 280/1.5 |
| 5,903,997 A | * | 5/1999 | Jacob | 43/1 |
| 5,971,410 A | * | 10/1999 | Nichols | 280/47.31 |
| 6,017,053 A | * | 1/2000 | Leger et al. | 280/653 |
| 6,039,333 A | | 3/2000 | Hamblin | 280/47.18 |
| 6,042,128 A | * | 3/2000 | Dinkins | 280/47.18 |
| 6,139,033 A | | 10/2000 | Western | 280/47.23 |
| 6,341,787 B1 | | 1/2002 | Mason | 280/47.26 |
| 6,375,200 B1 | * | 4/2002 | Harter | 280/30 |
| 6,764,093 B2 | * | 7/2004 | Allsop et al. | 280/653 |

* cited by examiner

Primary Examiner—Christopher P. Ellis
Assistant Examiner—G B Klebe
(74) Attorney, Agent, or Firm—Dennis W. Beech

(57) ABSTRACT

The hiker's trail carrier may be used for transport of cargo while walking or hiking. The trail carrier may have a pair of lower longitudinal members having a wheel rotatably mounted therebetween at an axle end of each and a transverse member attached between the lower longitudinal members intermediate the axle ends and a forward end of each. A pair of upper longitudinal members may be spaced apart and attached to the transverse member and a pair of vertical members may be attached to the upper longitudinal members and to the axle end. A pair of handle members may be pivotally attached to the lower longitudinal members intermediate the axle end and the forward end.

9 Claims, 3 Drawing Sheets

HIKER'S TRAIL CARRIER

BACKGROUND OF THE INVENTION

This invention relates to apparatus for transport of equipment supplies and other items when walking or hiking. The new carrier may have a load support frame with handles and harness members at the forward portion of the frame and a rotatably mounted wheel at the rearward portion of the frame.

Carriers and carts for transport of objects are generally known wherein there is a framework having a rotatably mounted wheel and a structure for a user to control and move the carrier. There may be handles and/or harness attachments associated with the carrier frame for the user to grasp or otherwise use to pull or push and balance the carrier. The structure may have carrying structure such as floors, seats, slings, straps and the like for carrying and securing objects to be transported. A simple, lightweight structure for ease of use by a single user that may also be used in rugged terrain may be useful.

SUMMARY OF THE INVENTION

The present invention is directed to apparatus for transport of cargo while walking or hiking. The trail carrier may have a pair of lower longitudinal members having a wheel rotatably mounted therebetween at an axle end of each and a transverse member attached between the lower longitudinal members intermediate the axle ends and a forward end of each. A pair of upper longitudinal members may be spaced apart and attached to the transverse member and a pair of vertical members may be attached to the upper longitudinal members and to the axle end. A pair of handle members may be pivotally attached to the lower longitudinal members intermediate the axle end and the forward end. The handle members may be used to balance or stabilize the single wheel trail carrier when in use while walking or hiking.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
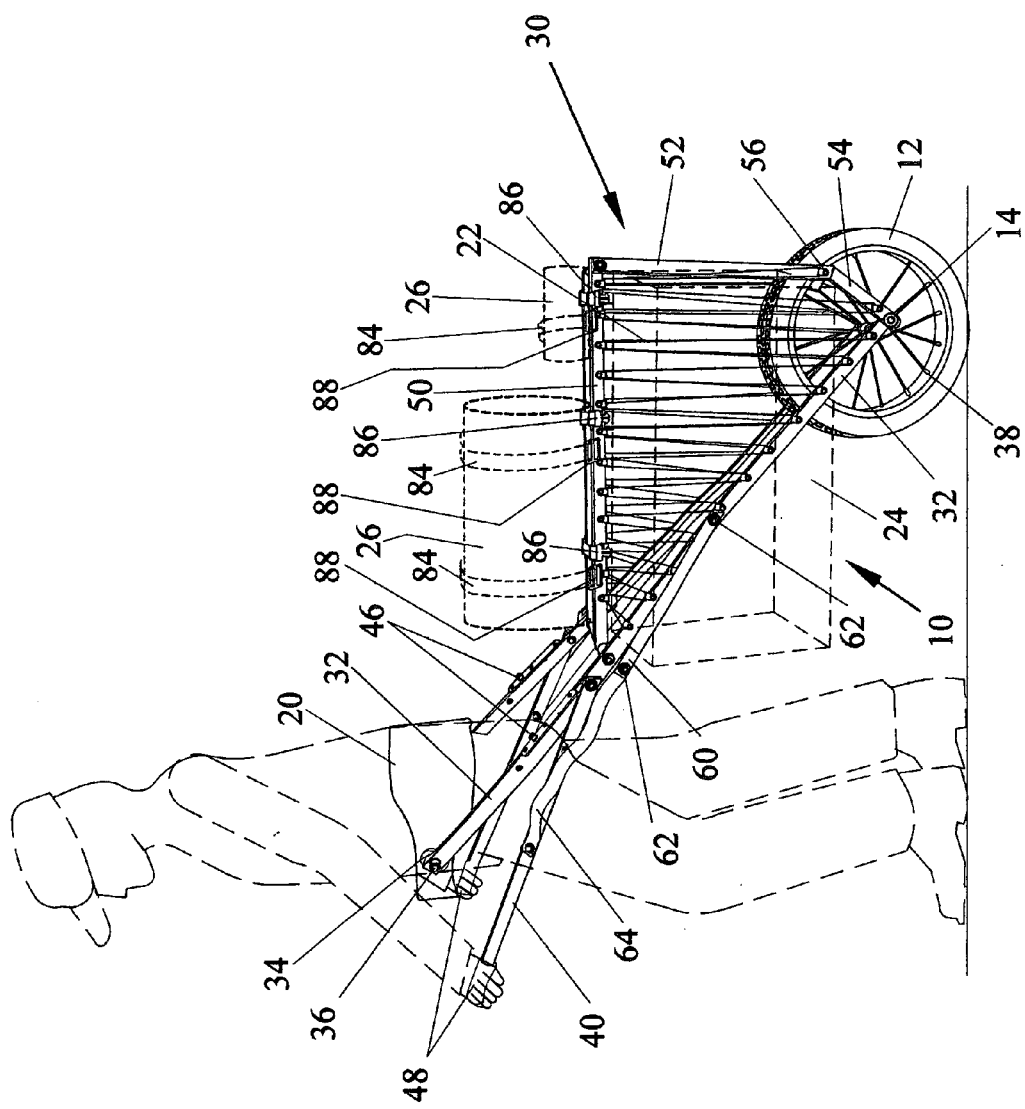
FIG. 1 illustrates a generally side elevation view of the trail carrier with cargo being pulled by a user.

Referring to FIG. 1, a trail carrier 10 may have a frame assembly 30 of generally triangular shape with a wheel 12 rotatably attached at an axle 14 at a lower, rear portion of the frame assemble 30. Lower longitudinal members 32 may have at a forward end 34 a belt attachment 36 for a belt 20, harness or the like. There may be a pair of handle members 40 pivotably secured to the lower longitudinal support members 32. The handle members 40 may be used to balance or stabilize the single wheel trail carrier 10 when loaded and in use while walking, hiking and the like activity.

Upper longitudinal members 50 may be attached to lower longitudinal members 32 intermediate the wheel 12 and the forward end 34 and to a generally vertical member 52 in a generally triangular shape. There may be a bridging member 54 attached at an angle to the lower end 56 of the vertical member 52 wherein the bridging member is also attached at the axle end 38 of the lower longitudinal member 32. Alternatively, the vertical member 52 may be attached at the lower end 56 directly to the axle end 38. Elastic or non-elastic rope, straps or cord 22 may be wound crosswise between the lower longitudinal member 32 and the upper longitudinal member 50 to form a wall to separate cargo attached externally to the frame assembly 30 and the wheel or cargo carried internally in frame assembly 30.

Figure 2:
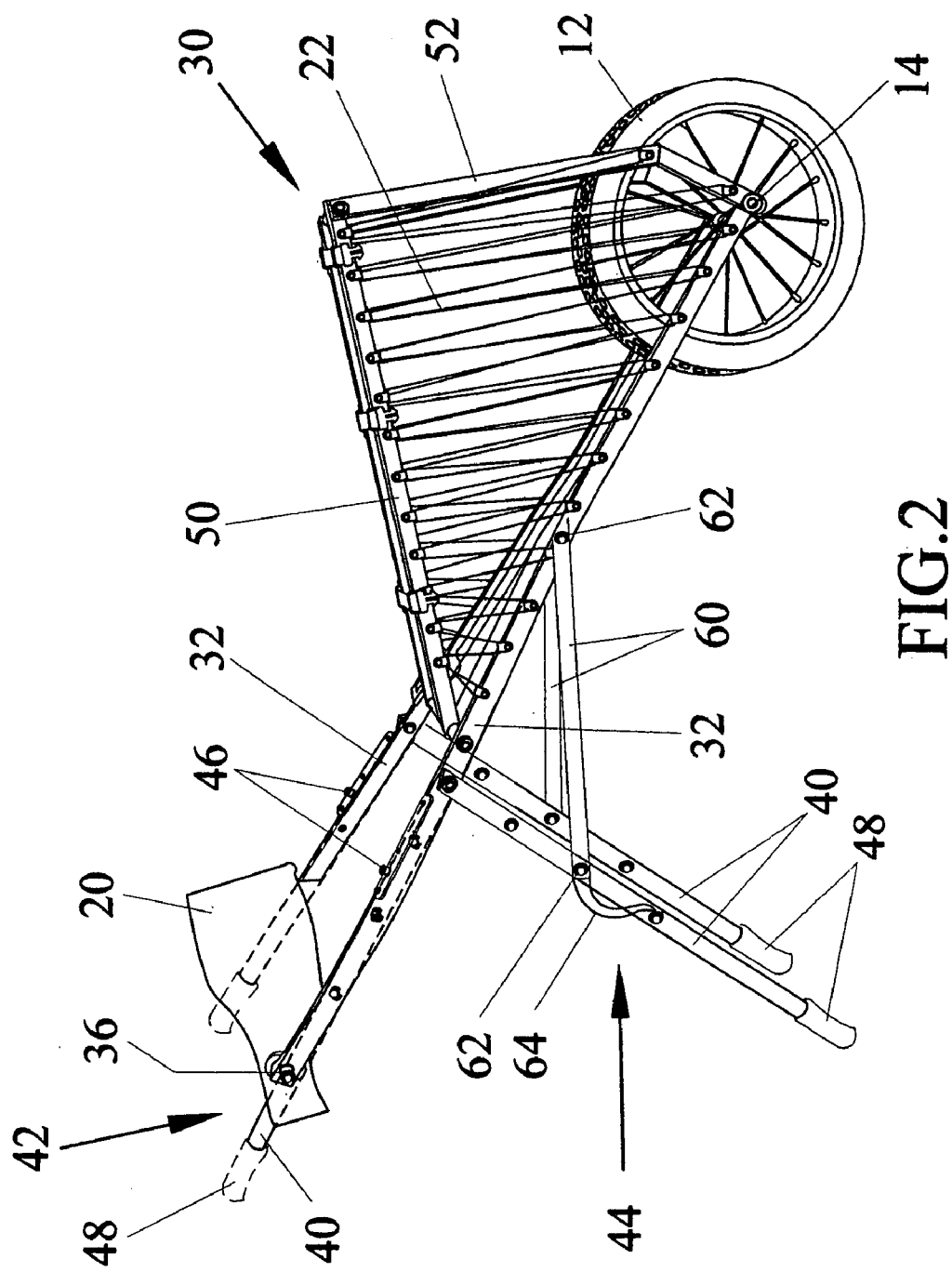
FIG. 2 illustrates a generally side elevation view of the trail carrier in the upright standing configuration.

Referring to FIGS. 1 and 2, the handle members 40 may be rotated from a fastened position 42 to an extend position 44. The handle members 40 may be fastened to lower longitudinal member 32 by fasteners 46. The handle members 40 may also be held by a user at handle ends 48 intermediate the fastened position 42 and the extended position 44 to aid in balancing the carrier 10 during use.

In the extended position 44 the handle members 40 may be used to support the carrier 10 in a free standing upright position. Straps 60 may be attached between the lower longitudinal member 32 and the handle member 40 to retain the handle member 40 in the extended position 44. Attachment may be by snaps 62, hooks or other fasteners. An elastic band 64 may be attached to the strap 60 and handle member 40 to prevent the straps 60 from dragging on the ground or otherwise becoming entangled with the carrier 10 when the straps 60 are not attached.

Figure 3:
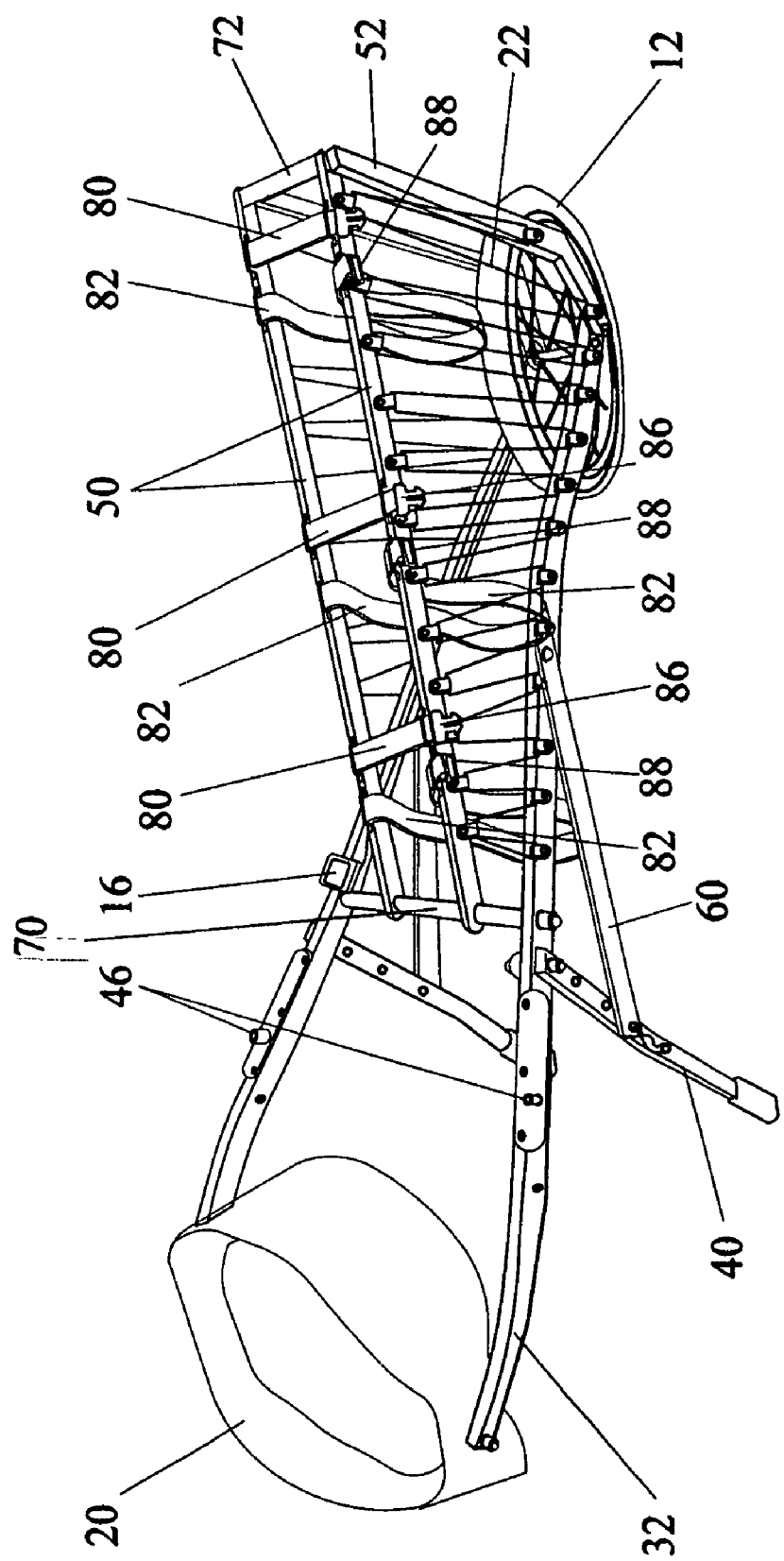
FIG. 3 illustrates a generally top perspective view of the trail carrier.

Referring to FIGS. 1 and 3, the lower longitudinal members 32 may be of a curvilinear shape having a narrow separation at the axle end 38 allowing insertion of the wheel 12 and a relatively wider separation at the forward end 34 to accommodate the user wearing the belt 20. The same relative separation may be accomplished by use of straight lower longitudinal members 32.

There may be a transverse member 70 for support between the lower longitudinal members 32 and attachment of the upper longitudinal members 50. There may also be a rear traverse member 72 attached between upper longitudinal members 50.

There may be attached straps, such as, mounting straps 80, sling straps 82 and object straps 84 attached to the frame assembly 30. The mounting straps 80 may have buckles 86 for attachment of saddlebags 24 or other containers with matching buckles. The object straps 84 may have friction buckles 88, clasps or the like to tighten the straps around objects 26 to be transported. The sling straps 84 may hang interior to the frame assembly 30 such that objects may be carried between the two walls or sides of the frame assembly 30.

The frame assembly 30 members may be constructed of box-section, tubular or other cross section shaped elements and may be of aluminum alloys, thin wall steel, fiber glass, plastic, composite material or like material adequate to support the cargo to be carried. There may be a mileage device 16 in communication with the wheel 12.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for transport of cargo while walking comprising:
   a pair of lower longitudinal members having a wheel rotatably mounted therebetween at an axle end of each and a transverse member attached between said lower longitudinal members intermediate said axle ends and a forward end of each;
   a pair of upper longitudinal members spaced apart and attached to said transverse member and to a rear transverse member;
   a pair of vertical members wherein each of said vertical members is attached between one of said upper longitudinal members and a respective one of said axle ends; and
   a pair of handle members wherein each of said handle members is pivotally attached to one of said lower longitudinal members intermediate said axle ends and said forward ends wherein said handle members are rotatable between a fastened position for balancing and stabilizing said apparatus and an extended position for supporting said apparatus in an upright position.

2. The apparatus as in claim 1 wherein a cord is wound crosswise between each of said lower longitudinal members and a respective one of said upper longitudinal members.

3. The apparatus as in claim 1 wherein a bridging member is attached to a lower end of each of said vertical members for attachment to a respective one of said axle ends.

4. The apparatus as in claim 1 wherein each of said handle members is attachable by a fastener to one of said lower longitudinal members to which it is pivotally attached.

5. The apparatus as in claim 1 wherein a belt fastenable about a user's waist is attached approximately at said forward ends of each of said lower longitudinal members.

6. The apparatus as in claim 1 wherein a mileage device is in communication with said wheel.

7. The apparatus as in claim 1 wherein there are a plurality of attachment straps attached to said upper longitudinal members.

8. The apparatus as in claim 1 wherein each of said lower longitudinal members and a respective one of said handle members having a strap fastened therebetween to retain said handle members in an extended position.

9. The apparatus as in claim 8 wherein an elastic band is attached to said strap and to each of said respective handle members.

* * * * *